US010855655B2

(12) United States Patent
Entezari et al.

(10) Patent No.: US 10,855,655 B2
(45) Date of Patent: Dec. 1, 2020

(54) SYSTEM AND METHOD FOR PROVIDING SECURE AND REDUNDANT COMMUNICATIONS AND PROCESSING FOR A COLLECTION OF INTERNET OF THINGS (IOT) DEVICES

(71) Applicants: Mehdi Entezari, Malvern, PA (US); Zachary Dremann, Malvern, PA (US); John A. Landis, Malvern, PA (US)

(72) Inventors: Mehdi Entezari, Malvern, PA (US); Zachary Dremann, Malvern, PA (US); John A. Landis, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 113 days.

(21) Appl. No.: 15/695,359

(22) Filed: Sep. 5, 2017

(65) Prior Publication Data

US 2019/0075080 A1    Mar. 7, 2019

(51) Int. Cl.
*H04L 29/06* (2006.01)
*H04L 29/08* (2006.01)

(52) U.S. Cl.
CPC ...... *H04L 63/0236* (2013.01); *H04L 63/0281* (2013.01); *H04L 63/061* (2013.01); *H04L 67/12* (2013.01)

(58) Field of Classification Search
CPC .............. H04L 63/0236; H04L 63/061; H04L 63/0281
See application file for complete search history.

(56) References Cited

U.S. PATENT DOCUMENTS

| | | | |
|---|---|---|---|
| 2012/0266209 A1* | 10/2012 | Gooding | H04L 63/20 726/1 |
| 2016/0182452 A1* | 6/2016 | Entezari | H04L 63/0254 726/13 |
| 2017/0006135 A1* | 1/2017 | Siebel | H04L 67/02 |
| 2018/0054490 A1* | 2/2018 | Wadhwa | G06F 9/45558 |
| 2018/0115520 A1* | 4/2018 | Neuman | H04L 63/1458 |

* cited by examiner

*Primary Examiner* — Mahfuzur Rahman

(57) ABSTRACT

A system for providing a system for providing network communications organized using communities of interests defined by a common encryption key. IoT devices are located at the edge of a network while providing secure and isolated communications for its applications and data through a common network infrastructure. The system's functionality provides the IoT network with secure communications to obtain data from devices by host applications over public networks. The data may be organized and segmented in a manner that isolates and protects the data with only authorized applications gaining access the data to see its existence and read its contents.

20 Claims, 10 Drawing Sheets

SYSTEM AND METHOD FOR PROVIDING SECURE AND REDUNDANT COMMUNICATIONS AND PROCESSING FOR A COLLECTION OF INTERNET OF THINGS (IOT) DEVICES

CROSS-REFERENCE TO RELATED APPLICATIONS

The present application is also related to, and claims priority from the following related and commonly assigned U.S. Patent Applications:

U.S. Provisional Patent Application entitled: Distributed Security on Multiple Independent Networks using Secure "Parsing" Technology, by Robert Johnson, Ser. No. 60/648,531, filed 31 Jan. 2005;

U.S. Patent Application entitled: Integrated Multi-Level Security System, by Robert Johnson, Ser. No. 11/339,974 filed 26 Jan. 2006 claiming the benefit of the above provisional applications;

U.S. Patent Application entitled: Integrated Multi-Level Security System, by Robert Johnson et al., Ser. No. 11/714,590 filed 6 Mar. 2007 which is a continuation-in-part of U.S. application Ser. No. 11/339,974;

U.S. Patent Application entitled: Integrated Multi-Level Security System, by Robert Johnson et al., Ser. No. 11/714,666 filed 6 Mar. 2007 which is a continuation-in-part of U.S. application Ser. No. 11/339,974; and U.S. Patent Application entitled: Integrated Multi-Level Security System, by Robert Johnson et al., Ser. No. 11/714,598 filed 6 Mar. 2007 which is a continuation-in-part of U.S. application Ser. No. 11/339,974.

U.S. patent application Ser. No. 12/272,012, entitled "Block Level Data Storage Security System", filed 17 Nov. 2008. The present disclosure also claims the benefit of commonly assigned U.S. patent application Ser. No. 12/336,558, entitled "Data Recovery Using Error Strip Identifiers", filed 17 Dec. 2008.

U.S. patent application Ser. No. 12/336,559 entitled "Storage Security Using Cryptographic Splitting", filed 17 Dec. 2008; U.S. patent application Ser. No. 12/336,562, entitled "Storage Security Using Cryptographic Splitting", filed 17 Dec. 2008; U.S. patent application Ser. No. 12/336,564, entitled "Storage Security Using Cryptographic Splitting", filed 17 Dec. 2008; and U.S. patent application Ser. No. 12/336,568, entitled "Storage Security Using Cryptographic Splitting", filed 17 Dec. 2008.

U.S. patent application Ser. No. 12/342,636 entitled "Storage Communities Of Interest Using Crytographic Splitting", filed 23 Dec. 2008. U.S. patent application Ser. No. 12/342,575, entitled "Storage Communities Of Interest Using Cryptographic Splitting", filed 23 Dec. 2008, U.S. patent application Ser. No. 12/342,610, entitled "Storage Communities Of interest Using Cryptographic Splitting," filed 23 Dec. 2008.

U.S. patent application Ser. No. 12/342,379, entitled "Secure Network Attached Storage Device Using Cryptographic Splitting," filed 23 Dec. 2008.

U.S. patent application Ser. No. 13/493,023, entitled "Software Handling Of Hardware Error Handling In Hypervisor-Based Systems," filed 5 Sep. 2012.

U.S. patent application Ser. No. 13/547,148, entitled "Automated Provisioning of Virtual Machines," filed 12 Jul. 2012.

U.S. patent application Ser. No. 14/042,239, entitled "Negotiation of Security Protocols and Protocol Attributes in Secure Communications Environment," filed 30 Sep. 2013.

U.S. patent application Ser. No. 14/042,182, entitled "Secured Communications Arrangement Applying Internet Protocol Security," filed 30 Sep. 2013.

The disclosures of each of these applications are hereby incorporated by reference in its entirety as if set forth in this application.

TECHNICAL FIELD

This application relates in general to a method, apparatus, and article of manufacture for providing secure and isolated communications and processing for a collection of devices belonging to various communities of interest that are connected to a computer network and under control of a Host Server. The application more specifically relates to a method and system for providing secure and isolated communications and processing to a set of Internet of Things (IoT) devices belonging to various communities of interest that communicate with to a Host Server.

BACKGROUND

For anyone who relies on an IoT network for their 24/7 business needs, security for communications between the endpoint devices and a controlling host computer may present challenges as the number of different device types multiplies. Secure communication has typically been provided by providing separate network connections or separate networks for a given type of endpoint device to ensure that data from this particular type of device may not be accessed by other devices or other applications executing on a host server. Providing a separate network for each and every type of endpoint device is expensive and possibly wasteful if the devices do not generate a significant amount of communications data.

Other approaches to security provide for the use of encryption of the data to be transmitted over a shared network in an attempt to provide security. Such approaches, however, still may expose the data to other processes which may be exploited using various means of hacking to gain access to passwords and other forms of data used to create encryption keys. Additionally, these approaches typically present all devices as network devices at specific IP addresses that inform others of the existence of the devices and thus provide a mechanism to monitor and or attack the devices.

The present invention attempts to address the existing limitations in current IoT network and device communications according to the principles and example embodiments disclosed herein.

SUMMARY

In accordance with the present invention, the above and other problems are solved by providing a system for providing micro-segmented network communications organized using communities of interests defined by a common encryption key. IoT devices such as sensors are located at the edge of a network While providing secure and isolated communications for its applications and data through a common network infrastructure.

The great utility of the invention is that a user can rely on the functionality provided by the IoT network to securely obtain data from a variety of sensor devices communicating securely with applications running on host computers in a remote data center over public networks such as the internet. The data may be organized and segmented in such a manner that the data is isolated and protected with only applications and processors needing to access the data to see its existence and read its contents. All of the functionality may be provided using a common secure communications protocol designed to provide all of these attributes.

The present invention may include a distributed processing system for collecting and analyzing edge device data over a secure communications network. The distributed processing system comprises one or more host computers connected to the secure communications network, the secure communications network supporting one or more communities of interests to isolate communications data, and a plurality of edge devices communicating with one or more of the device data processing applications within their respective community of interest. Each one of the one or more communities of interest isolate its data using separate encryption keys, and each device within a particular community of interest responds to one or more received communications packets only when the data is part of the particular community of interest. Additionally, the host computers may include one or more device data processing applications for receiving and analyzing device data.

In another embodiment, the present invention may include a computer implemented method for collecting and analyzing edge device data over a secure communications network. The method configures an edge device gateway to communicate over a secure communications network within one or more communities of interest, initiates collection of edge device data within one or more edge devices coupled to the edge device gateway, and receives the edge device data over the over a secure communications network within one or more communities of interest. Each one of the one or more communities of interest isolate its data using separate encryption keys. Each device within a particular community of interest responds to one or more received communications packets only when the data is part of the particular community of interest. Edge devices may include a data generating sensor.

In yet another embodiment, the present invention may include A computer data product containing a non-transitory computer readable storage medium comprising a set of instructions, which when executed by a computing device, cause the computing device to implement a method for collecting and analyzing edge device data over a secure communications network. The method configures an edge device gateway to communicate over a secure communications network within one or more communities of interest, initiates collection of edge device data within one or more edge devices coupled to the edge device gateway, and receives the edge device data over the over a secure communications network within one or more communities of interest. Each one of the one or more communities of interest isolate its data using separate encryption keys. Each device within a particular community of interest responds to one or more received communications packets only when the data is part of the particular community of interest. Edge devices may include a data generating sensor.

The foregoing has outlined rather broadly the features and technical advantages of the present indention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
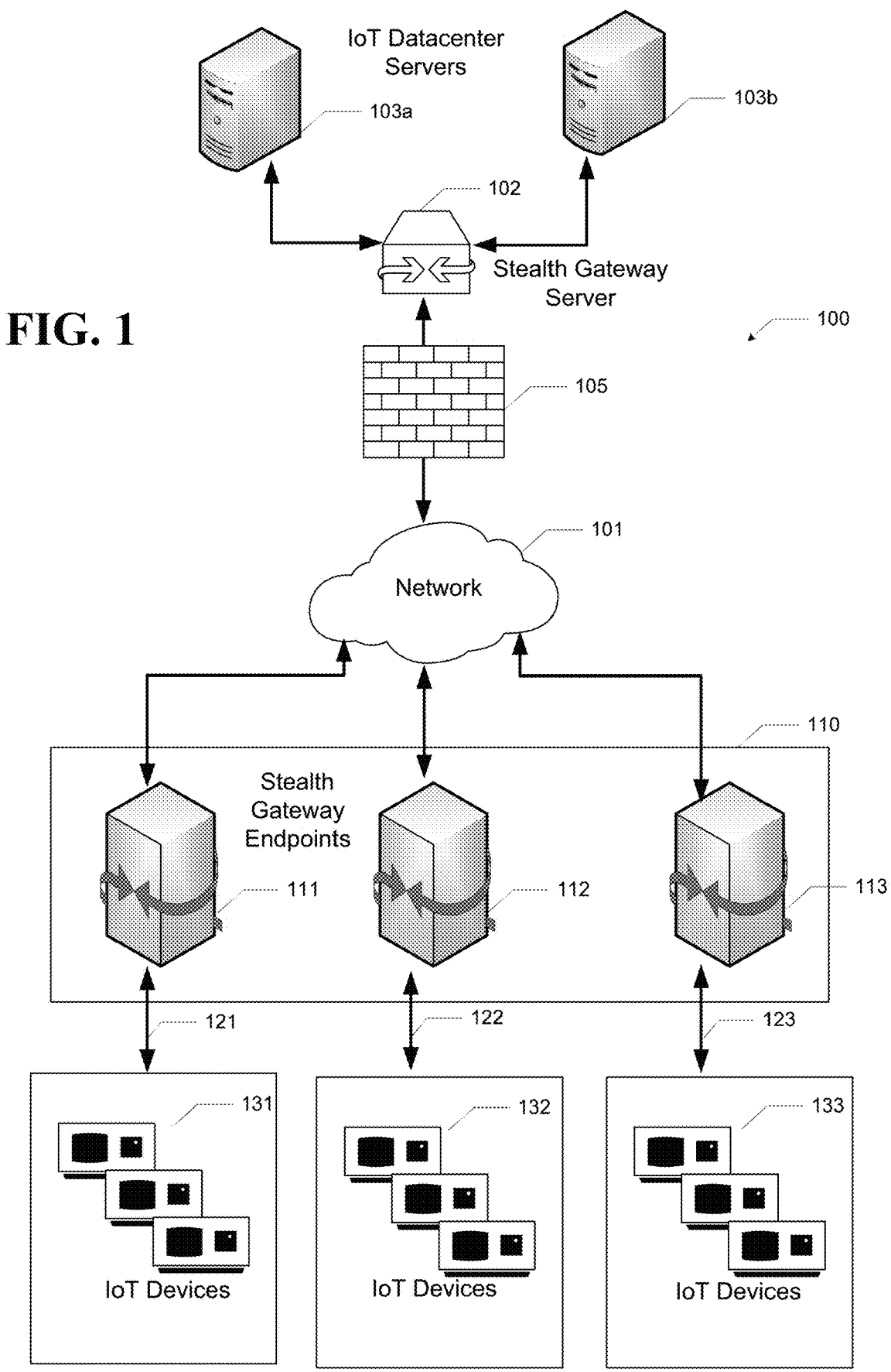
FIG. 1 represents one potential embodiment of a secure network connecting a plurality of IoT devices to an IoT Host Server via a communications network according to one embodiment of the present invention.

The application specifically relates to a method and system for providing secure and isolated communications and processing to a set of Internet of Things (IoT) devices belonging to various communities of interest that communicate with to a Host Server.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to methods and systems for providing a secure communication between a host computing system and endpoint devices including isolation between devices and data associated with different community of interests. FIG. 1 represents one potential embodiment of a secure network connecting a plurality of IoT devices to an IoT Host Server via a communications network according to one embodiment of the present invention. While the example embodiments discussed herein relate to the endpoint devices being IoT type devices, one skilled in the art will recognize that the present invention is applicable to other possible networked devices and the present invention is to be limited only by the claims. The network system 100 of FIG. 1 provides a mechanism for communications between one or more IoT servers 103*a*, 103*b* and one or more sets of endpoint devices 131-133.

Figure 2:
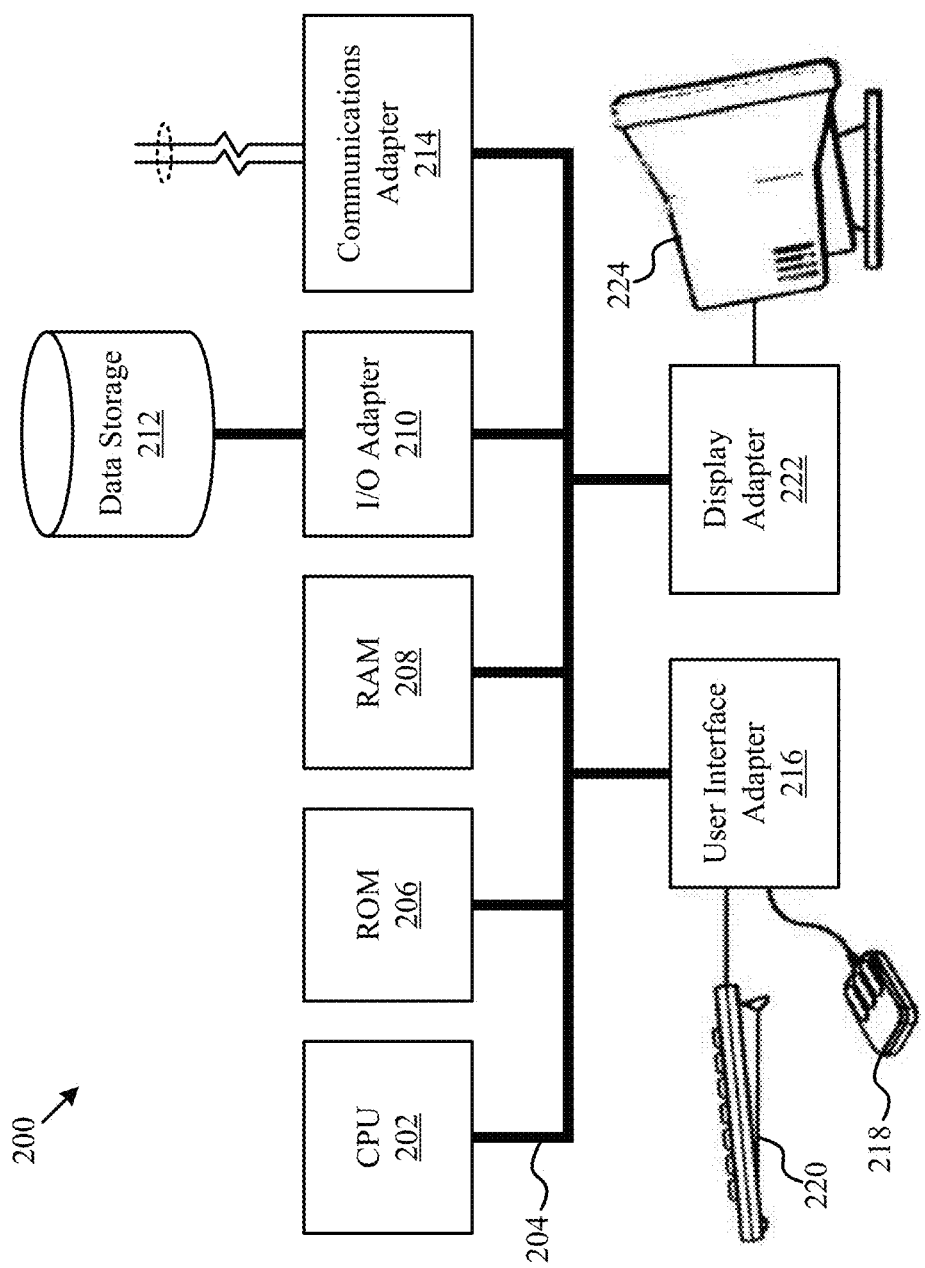
FIG. 2 illustrates a general purpose computing system for use in implementing as one or more computing embodiments of the present invention.

To better understand the present invention, FIG. 2 represents one potential embodiment of a secure network connecting a plurality of IoT devices to an IoT Host Server via a communications network passing data thru multiple gateway devices. The Host servers 103*a*, 103*b* communicate over a general purpose network 101 via a server gateway 102 and firewall 105. Network 101 may be any communications network including the internet, an enterprise network, an open wireless network, and any similar communications network. Firewall 105 provides protection from other users of network 101 and the host servers 103*a*, 103*b*. Firewall 105 may be any type of firewall whether an application running in a server, such as server gateway 102, or part of a communications router/switch that connects network 101 to the servers 103*a*, 103*b*.

Server gateway 102 provides establishment, management, and processing of a secure communications with one of the endpoint gateways 111-113 using the secure processing known as STEALTH™ offered by the UNISYS CORPORATION. The server gateway 102 and endpoint gateways 111-113 communicate using an encryption key associated with a community of interest. Only members of the community of interest may access the encryption key and thus receive and send data between these gateway devices. Additionally, the gateway devices do not respond to a message sent to them over the network 101 unless it recognizes the source of the message as being a member of a recognized community of interest that is attempting to communicate with an endpoint device 131-133 and/or an application running in host servers 103*a*, 103*b* that is also a member of the same community of interest. This solution allows users to communicate with other users having common user rights, while segregating user groups by way of assignment of different cryptographic keys used for each user group, or "community of interest". A community of interest is a plurality of users whose membership in a particular community of interest defines the plurality of users' authority to access data encrypted by the one or more workgroup key.

As such, attempts to establish a connection with these entities ox to ping these entities will not generate a response and the existence of these entities remain unknown to other users of network 101. Additional details of server gateway 102, endpoint gateway 111-113, and their operation and communications with each other may be found in any of the above commonly assigned and above cited application, such as U.S. patent application Ser. No. 14/042,182, entitled "Secured Communications Arrangement Applying Internet Protocol Security", filed 30 Sep. 2013.

Each of the endpoint gateways 111-113 communicate with their own sets of devices 131-133 using one of many communications protocols. These connections may be wired connections or wireless connections that may implement secure or unsecure communications as needed by the implementation. Examples of protocols that may be supported Wifi, LoRaWAN, wired Ethernet, serial, Bluetooth, Zigbee, 4G Cellular, and fiber channel connections. Of course, one skilled in the art will recognize that the selected communications protocol may be applicable to other possible networked devices and the present invention is to be limited only by the claims With reference to FIG. 2, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB).

A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 3:
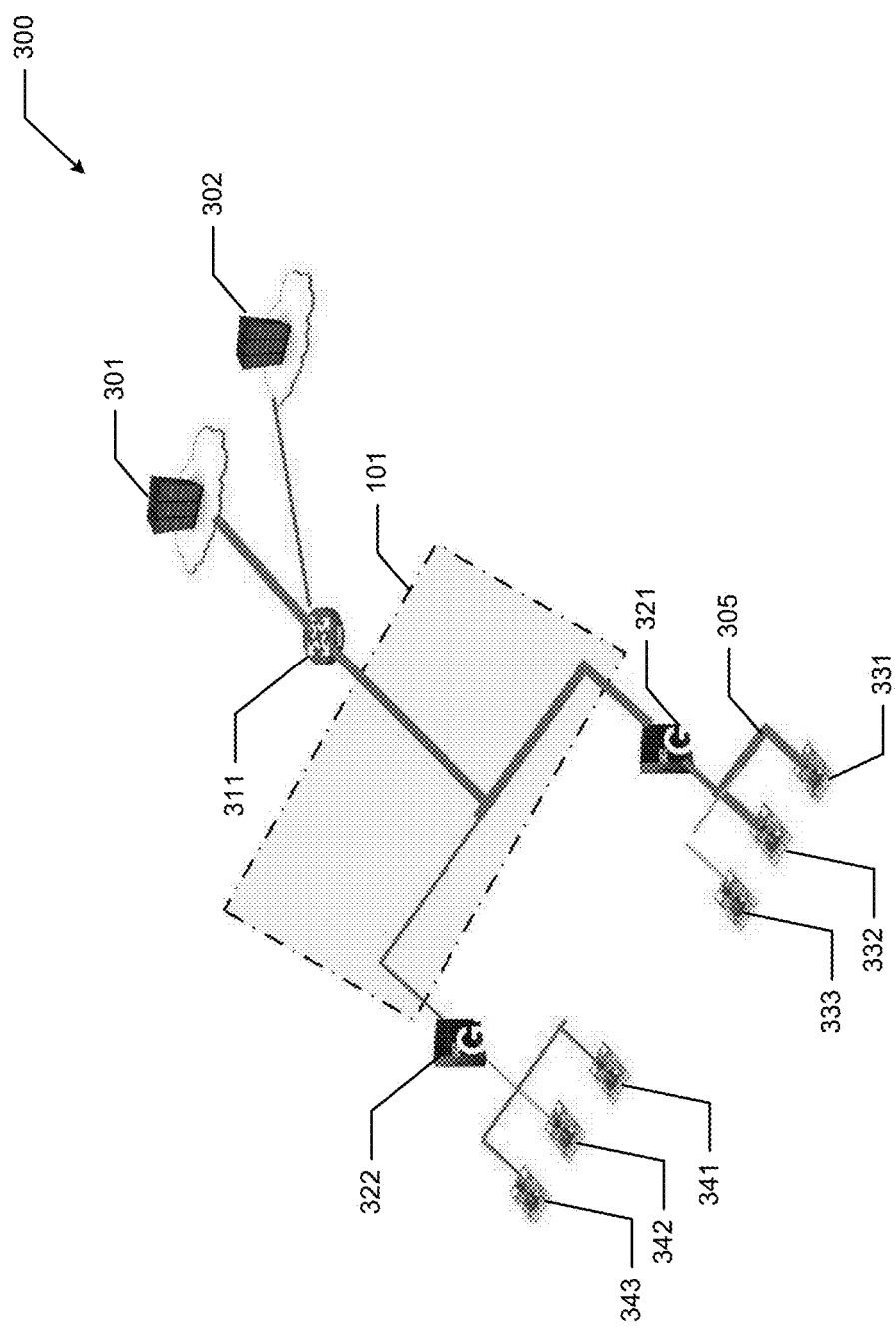
FIG. 3 illustrates a secure communications network utilizing micro-segmentation to provide secure isolation of communities of interest according to an example embodiment of the present invention.

FIG. 3 illustrates a secure communications network utilizing micro-segmentation to provide secure isolation of communities of interest according to an example embodiment of the present invention. In the system 300, host servers 310-302 communicate with endpoint devices 331-333, 341-343 securely through server gateway 311 and endpoint gateways 321-322. Communications for one particular community of interest 305 connects host server 301 to only endpoints 331-332 via server gateway 311 and endpoint gateway 321. None of the other servers, devices, and endpoints can communicate with this community of interest and cannot detect its existence.

Other communities of interests connecting different collection of server applications and endpoints may also be created and operate over a common communications network 304 using encrypted data and the endpoints enforcing the process that only messages for devices within a particular community of interest will be accepted and generate a response. Each of the communities of interest may be viewed as a micro-segment of the larger network 305 enforced by the operation of the gateways.

Figure 4B:
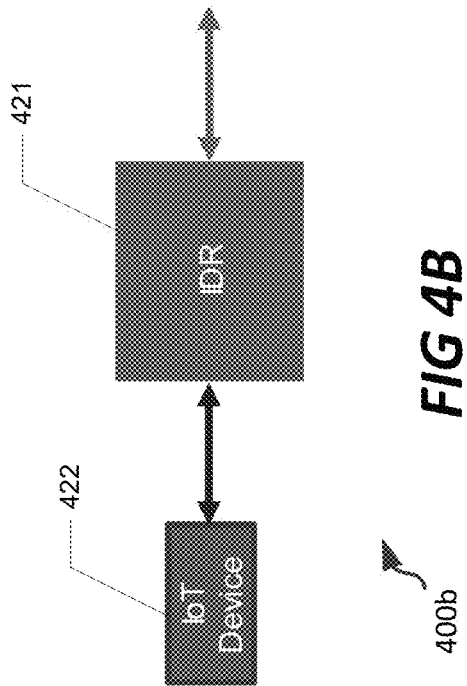
FIG. 4B illustrates an example IoT Device Relay application for use within a secure gateway according to an embodiment of the present invention.
Figure 4A:
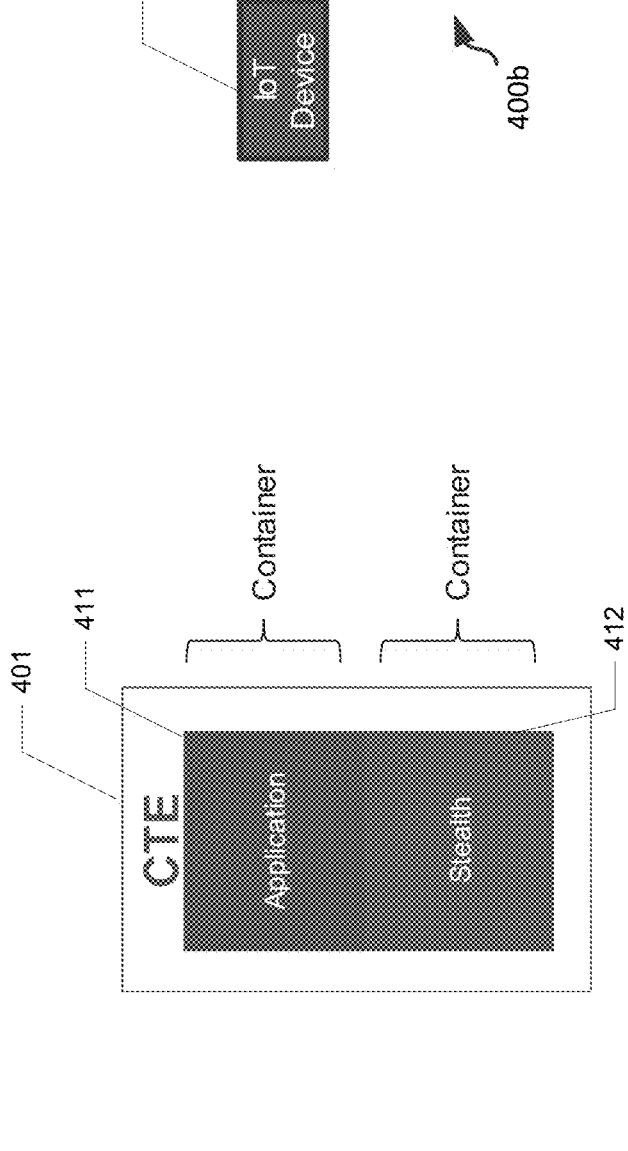
FIG. 4A illustrates an example containerized application for use in a secure gateway according to an embodiment of the present invention.

FIG. 4A illustrates an example containerized application for use in a secure gateway according to an embodiment of the present invention. To understand many of the embodiments disclosed herein, virtualized processing using containers are utilized to provide processing services within servers. A Docker containerized application that permits an application to execute as a self-contained virtual computing system that implements the desired application function. Application 411 and stealth security communication functions 412 may be implemented as separate containers within server 401 to provide a Containerized Trusted Endpoint (CTE) in an endpoint gateway. The container typically includes an application and a small OS kernel including any needed function libraries to permit the application to function. The server 411 may permit these containers to execute as a virtual computing device within itself to implement any desired functionality. Because a container may be launched within any device supporting these virtual computing applications and also contain any application written and configured to execute within the container, any functionality needed may be supported within a host gateway and an endpoint gateway as discussed above with respect to FIG. 1. Additionally, the functionality of these gateway devices may be altered by starting a new containerized application within a gateway device. The new application may either replace an existing application or add an additional application to the gateway device. The number of virtual applications that may exist within a given gateway device is limited by the computing resources of the gateway devices. Large numbers of virtualized applications within these containers may be supported by a single computing system if there is sufficient memory, network bandwidth, and CPU support to provide the processing needed by these applications. Gateway devices may be implemented with computing components to support these requirements.

FIG. 4B illustrates an example IoT Device Relay application for use within a secure gateway according to an embodiment of the present invention. IoT Device Relay [IDR] application typically is run within a container as discussed above.

Figure 5A:
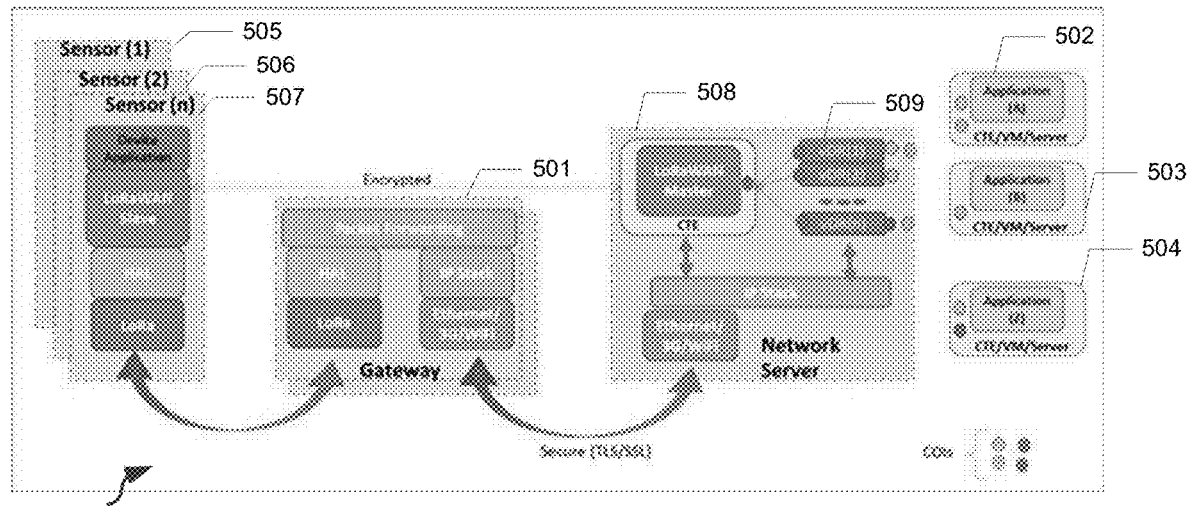
FIG. 5A-5D illustrates an example Host Server and Gateway device according to another embodiment of the present invention.

FIG. 5A-5D illustrates an example Host Server and Gateway device according to another embodiment of the present invention. FIG. 5A illustrates a micro-segmented processing system 500a for a smart cities initiative according to one possible embodiment. In this embodiment, a plurality of applications running in their own server 502-504, where these servers may be implemented a separate hardware servers and/or virtualized servers running on one or more large servers, receive and process data from a plurality of sensors 505-507. The servers 502-504 communicate with the sensors 505-507 using a pair of secure gateways, server gateway 508 and endpoint gateway 501. The endpoint gateway 501 performs a packet forwarding function to securely move the sensor data from the sensors 505-507 to and applications 502-504 as well as implement any needed functions to support the communications and data protocols used by the sensors 505-507.

Each of the sensors may be of a different type of sensor that requires its own commands, data formats, and communication protocols which are implemented by the separate applications 502-504. The server gateway 508 and the endpoint gateway 501 implement the STEALTH™ security model discussed above in which each of the types of sensors and their respective data belong to their own separate community of interest. As such, the data from one set of sensors may be seen only by the application, and by extension its permitted users, while the other sensors and data are not visible and accessible by the application. As such, each of the sets of sensors and their respective data is isolated from each other while sharing a common datacenter and communications network.

In this and all of the described embodiments, the gateway devices may be implemented within a server class processing system in which the described application processes may be instantiated and run. Depending upon the resources needed by the applications, these servers may be part of the network infrastructure or may be separate device attached to the network 101 through which the sensor data and any needed operating commands are passed.

Figure 5B:
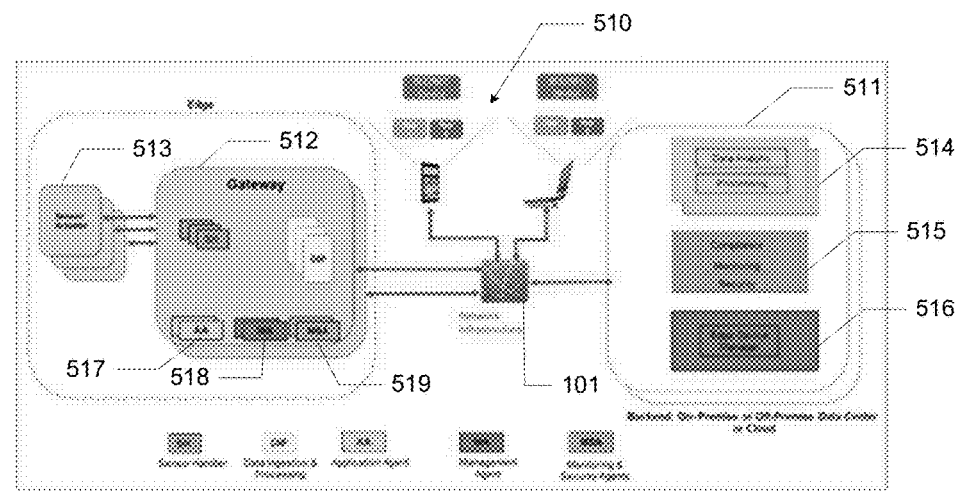

FIG. 5B illustrates a second embodiment of a secure micro-segmented data processing system. In this particular embodiment, host server 511 contains a set of system utility functions, including data analytics and data processing 514, compliance, security and monitoring 515, and edge device management 516. The data analytics and data processing 514 provides processing functions to receive all of the sensor data from sensors 513 to generate useful analysis associated with the data generated. Compliance, security and monitoring 515 provides system health and security functions to maintain knowledge of the operating status of all of the devices within the overall system 500b. These functions also identify security related functions and observed breaches to implement procedures to terminate and breach and mitigate and damages that may be associated with the breach. Edge device management 516 provides overall operational control of the sensors 513 and the functions within the endpoint gateway 512.

Each of the above three operate in conjunction with a set of gateway agents 517-519, with each of the types of functions typically having their own set of agents within the endpoint gateway 512. Each of these three types of functions may operate within their own separate community of interest such that each of the functions may only see its own agents, devices, data, and applications without knowing of the existence of and seeing data associated with the other functions. One of ordinary skill in the art will recognize that these three types of functions having separate communities of interest are not the exclusive list of possible communities and any other type of similar functions may be similarly implemented as part of an overall system 500b.

Figure 5C:
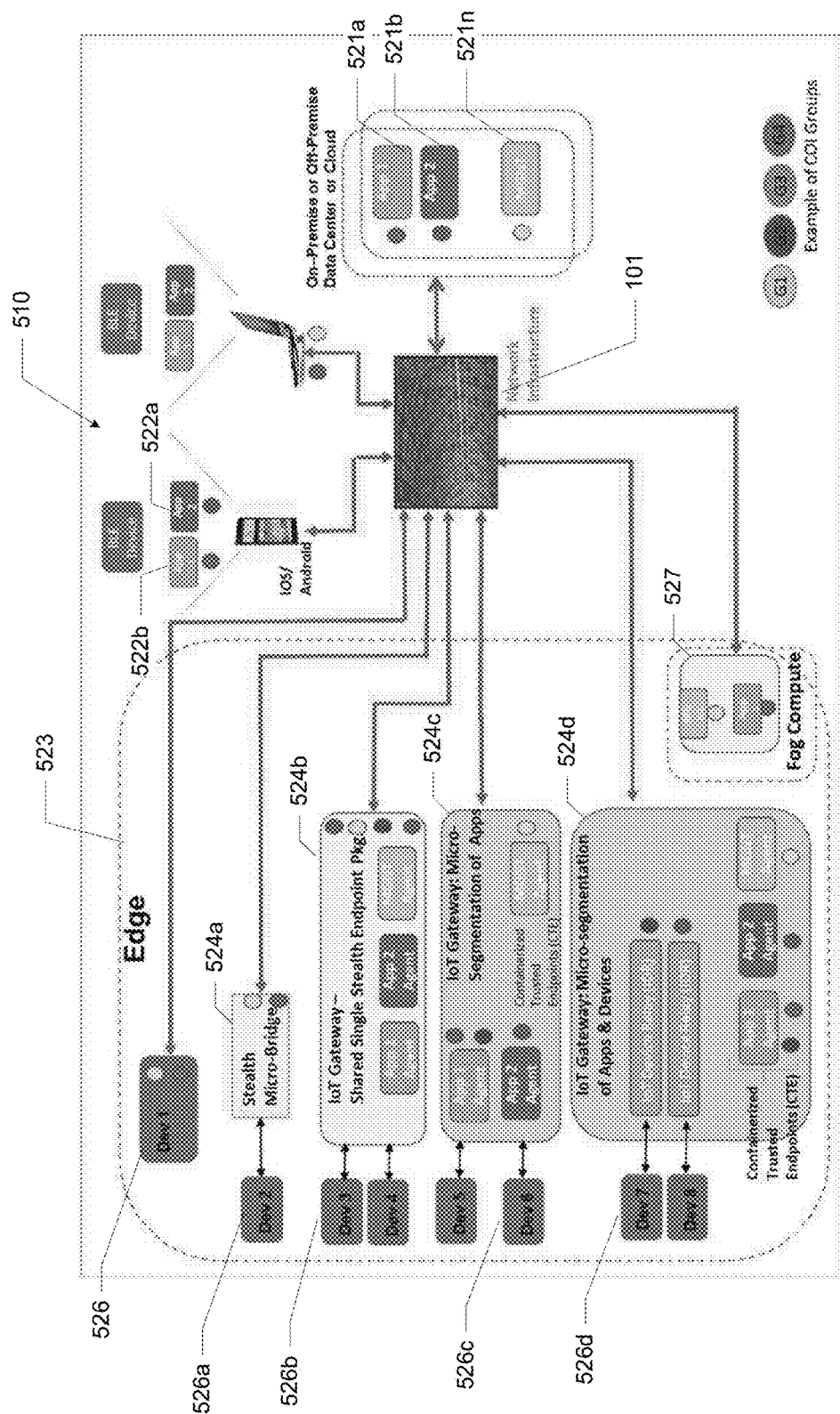

FIG. 5C illustrates a third embodiment of a processing system 500c that identifies the various types of containerized applications that may include STEALTH™ containerized functions according to the present invention. In this embodiment, a set of edge devices 526-526d are connected to communications network 101 in a number of different ways. All of the devices communicate with applications 512a-n in a host computer that is connected to network 101. Device 1 526 is directly connected to the network 101. Device 1 526 contains the necessary networking resources as well as software to implement the STEALTH™ endpoint functionality such that the device may be part of a community of interest.

Device 2 526a connects to Stealth Micro-Bridge 524a to connect to the network 101. Device 2 526a operates similarly to Device 1 526 in that the device itself directly communicates with data center applications 521a-n. However, device 2 526a itself does not contain networking and Stealth functionality; those functions are within the Stealth Micro-Bridge 524a.

Devices 3-4 526b represent two or more devices connected to an IoT gateway 524b. As discussed above, the IoT gateway 524b may possess one or more agents running within the gateway to perform functions to connect the devices 526b to their corresponding data center applications 521a-n. Devices 5-6 526c represent two or more devices connected to an IoT gateway 524c that includes micro-segmentation of applications. As discussed above, the IoT gateway 524c may possess one or more agents running within the gateway to perform functions to connect the devices 526c to their corresponding data center applications 521a-n in which each of the devices are part of their own community of interest.

Devices 7-8 526d represent two or more devices connected to an IoT gateway 524d that includes micro-segmentation of applications. As discussed above, the IoT gateway 524c may possess one or more agents running within the gateway within containerized trusted endpoints to perform functions to connect the devices 526d to their corresponding data center applications 521a-n in which each of the devices are part of their own community of interest.

The processing system 500c illustrates one possible embodiment of a system. Such a system may include any number of the various STEALTH™ gateways 526a-d in various combinations as needed to connect all of the needed edge devices 526-526d to the processing system. Additionally, the processing system may also include a fog computing module 527 containing one or more application agents that communicate with their corresponding applications 521a-n in the data center. Each of these agents may be part of one or more communities of interest as they are described above with respect to their use within IoT gateways 524a-d. The agents within the fog computing module 527 may perform data processing, analysis and analytic functions within processing modules with the network edge 523 based upon data from one or more devices. This processing within the fog computing module 527 allows large amounts of data generated by various sensors and devices to be averaged, combined and processed into meaningful data near the devices 526-526d that would reduce the processing latency of the data as well as reduce the network bandwidth needed to support the devices and data center communications.

Processing system 500c may also support remote mobile devices 510, such as mobile smartphones, laptops and tablets connected to network 101. These mobile devices 510 may run application agents 522a-b to place these devices within one or more communities of interest. Using these devices 510, a user may observe, monitor, and control the operation of the processing system 500c, or the devices within the communities of interest in which the devices 510 are members, while operating with the same communication security of all of the other components of processing system 500c.

Figure 5D:
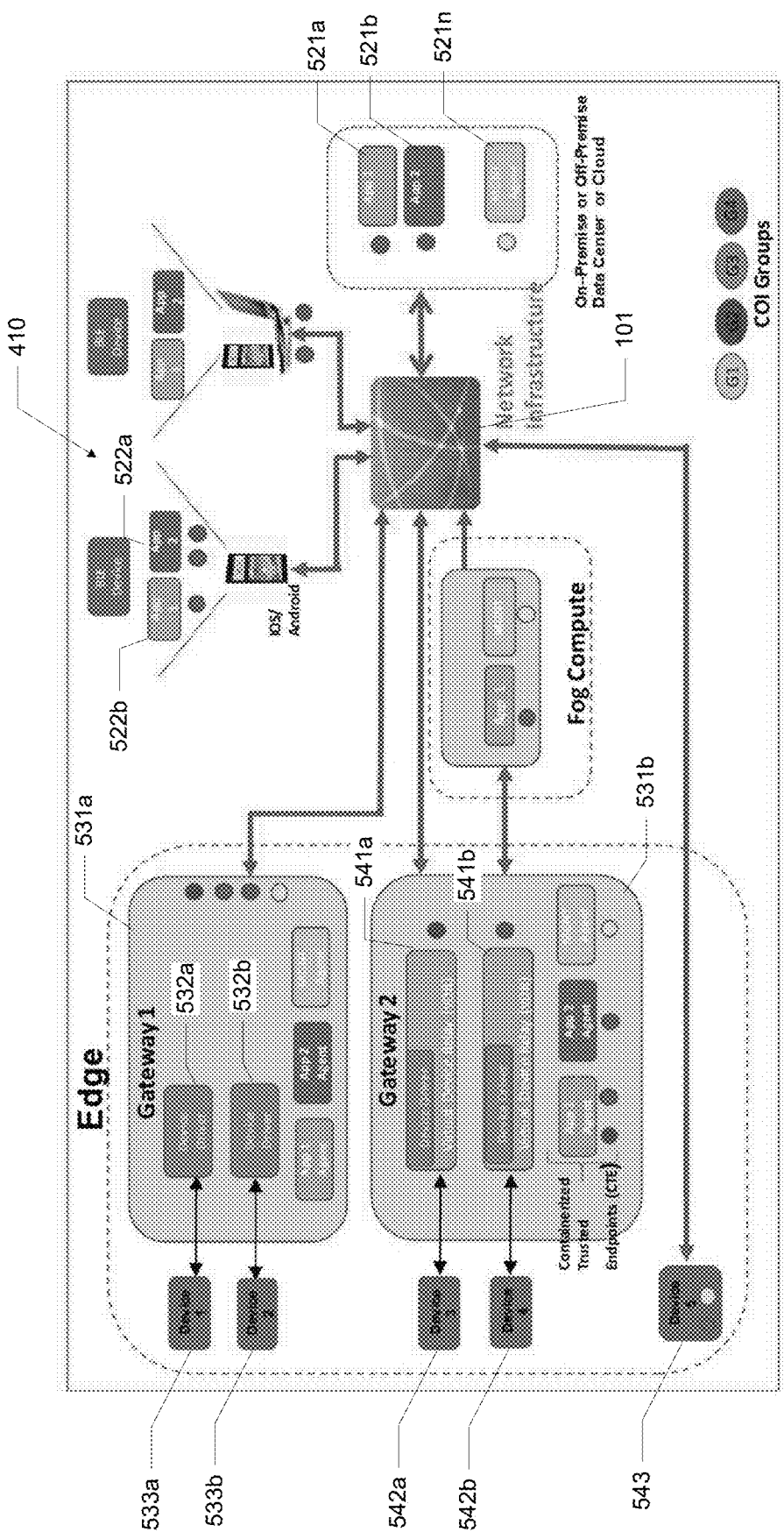

FIG. 5D illustrates a third embodiment of a processing system 500c that identifies the various types of containerized applications that may include STEALTH™ containerized functions according to the present invention. In this embodiment, containerized applications are included within endpoint gateways 531a-531b that include device drivers 532a-532b as discussed below in reference to FIG. 6. In addition, containerized applications are included within endpoint gateways 531a-531b that include device drivers 532a-532b that are embedded within Virtual Relay Devices (vDR).

In this embodiment, the features of system 500a of FIG. 5A and the features of system 500b of FIG. 5B are combined into a single system 500c. Application A 521a and Application B 521b communicate with a plurality of sensors 526a-526d via containerized application packages 524a-524d as well as directly with Device 1 526.

The first type of device connection to the system 500c is a direct device connection 526 to the network 101. The device 526 must implement the STEALTH™ protocol to communicate with Application A 521a and Application B 521b. All of the data from the device 526 is communicated to the host servers and supporting applications, Application A 521a and Application B 521b.

The second type of device connection 524a provides a STEALTH™ micro-bridge from Dev 2 526a to Application A 521a and Application B 521b. As noted above, device 2 526a operates similarly to Device 1 526 in that the device itself directly communicates with data center applications 521a-n. However, device 2 526a itself does not contain networking and Stealth functionality; those functions are within the Stealth Micro-Bridge 524a.

The third type of device connection utilizes a shared single Stealth Endpoint 524b that communicates with Application A 521a and Application B 521b via corresponding App Agents within the Endpoint package 524b. The fourth type of device connection utilizes a shared micro-segmented Stealth Endpoint 524c that communicates with Application A 521a and Application B 521b via corresponding App Agents within the Endpoint package 524c. The difference between shared single Stealth Endpoint 524b and shared micro-segmented Stealth Endpoint 524c is that the shared single endpoint 524b connects all of its devices 526b to the same set of communities of interest as compared to the micro-segmented endpoint 526c in which App Agent A connects to the devices 526c with a different set of communities of interest from App Agent B. In the latter arrangement, the App Agent data and processing is isolated from other sets of devices and data in different groups of users may access or control the sensors and agents. An example of a system that may utilize the that arrangement may be a hospital in which patient data may be isolated by discipline, such are cardiology and neurology, or may be isolated by user type, such as doctor, nurse, laboratory tech, etc.

The final type of device connection provides micro-segmentation of both applications and devices in the Endpoint package 524d. In this type of endpoint package, each of the devices 526d are separately connected to its own correspond IoT Device Relay (IDR) application. Each of these IDR applications may be part of separate communities of interest from each other and the App Agents communicating with Application A 521a and Application B 521b may or may not be members of the same community of interest. The Endpoint package 524d illustrates that the IDR for Dev 7 may match a community of interest membership with App A Agent as well as a second community of interest. In contrast, the IDR for Dev 8 may only match the community of interest membership with App B Agent. Any combination of membership may be supported as is supported by the STEALTH™ protocols.

As noted above, each of the connection types are typically implemented within its own containerized application running in common server as virtual processing machines. Whether more than one physical computing devices after used to support a set number of endpoint packages 524a-524d is a matter of design choice that one of ordinary skill in the art will make to match the computing resource needs of the endpoint packages and the available resources in the server devices.

Endpoint gateway 512, 523, 531a, and 5341a may also include other processing functions such as data integration and processing functions to perform initial processing upon the sensor data before it is sent to host server 511. Time averaging of sensor data and noise reduction data processing are two of the types of example functions that may be included within the data integration and processing functions. Endpoint gateway 512, 523, 531a, and 5341a may also include separate sensor handler functions to provide an interface from the particular sensors and its corresponding communications protocol that are isolated from all of the other functions in its own community of interest. Isolating these additional functions in this manner will increase the security of the overall system as it limits the functionality and access to data for these functions permitting access to only resources and data needed to perform the particular functions.

Additionally, the order in which the above types of device connections are described is not intended to provide any significance to the manner in which system may utilize any of all of these connection types. The order was presented in an attempt to present all of the readily know types of connections for devices and applications with clarity/.

Figure 6A:
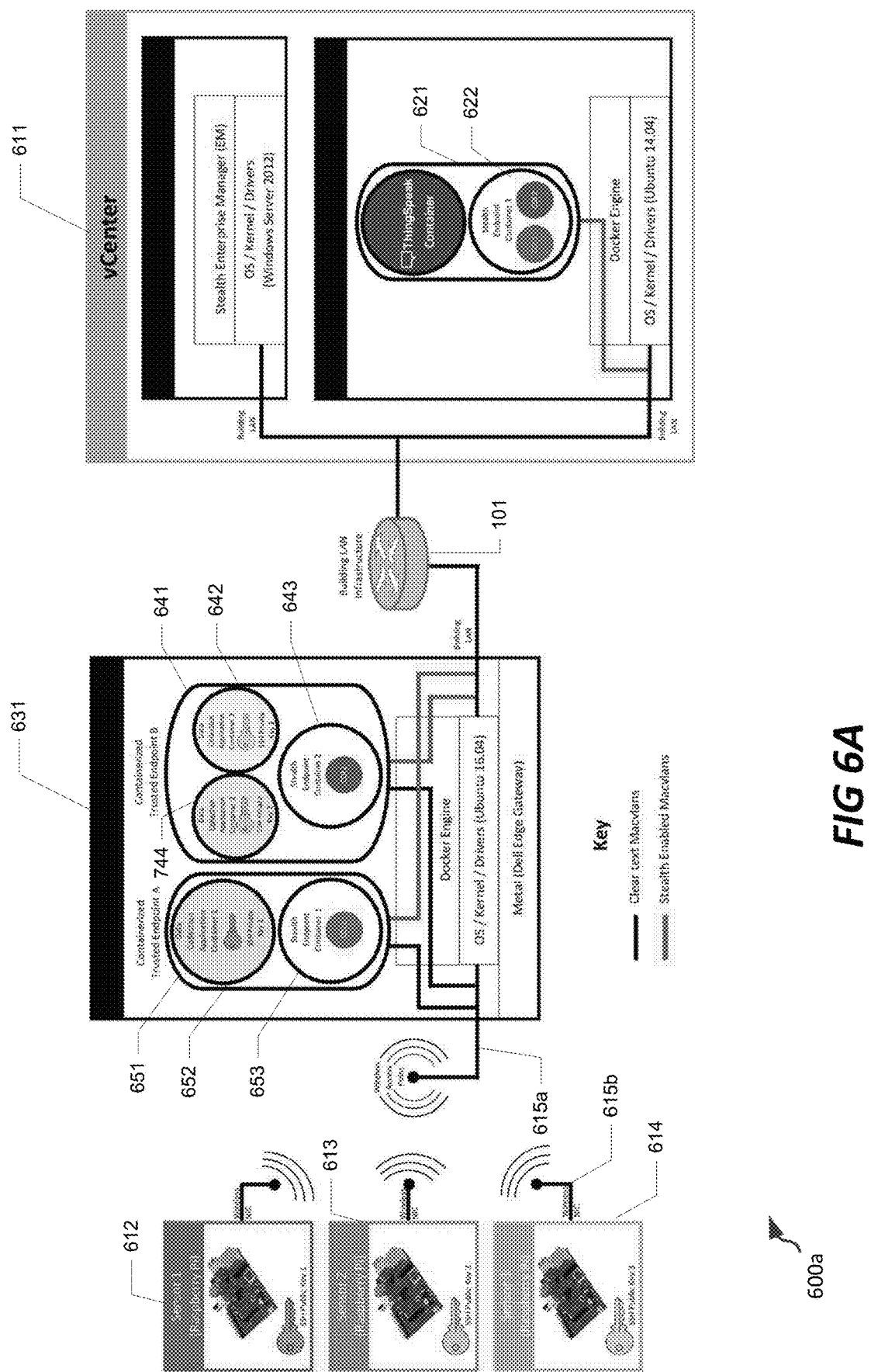
FIG. 6A-6B illustrate example secure gateway devices for use within IoT devices according to an embodiment of the present invention.
Figure 6B:
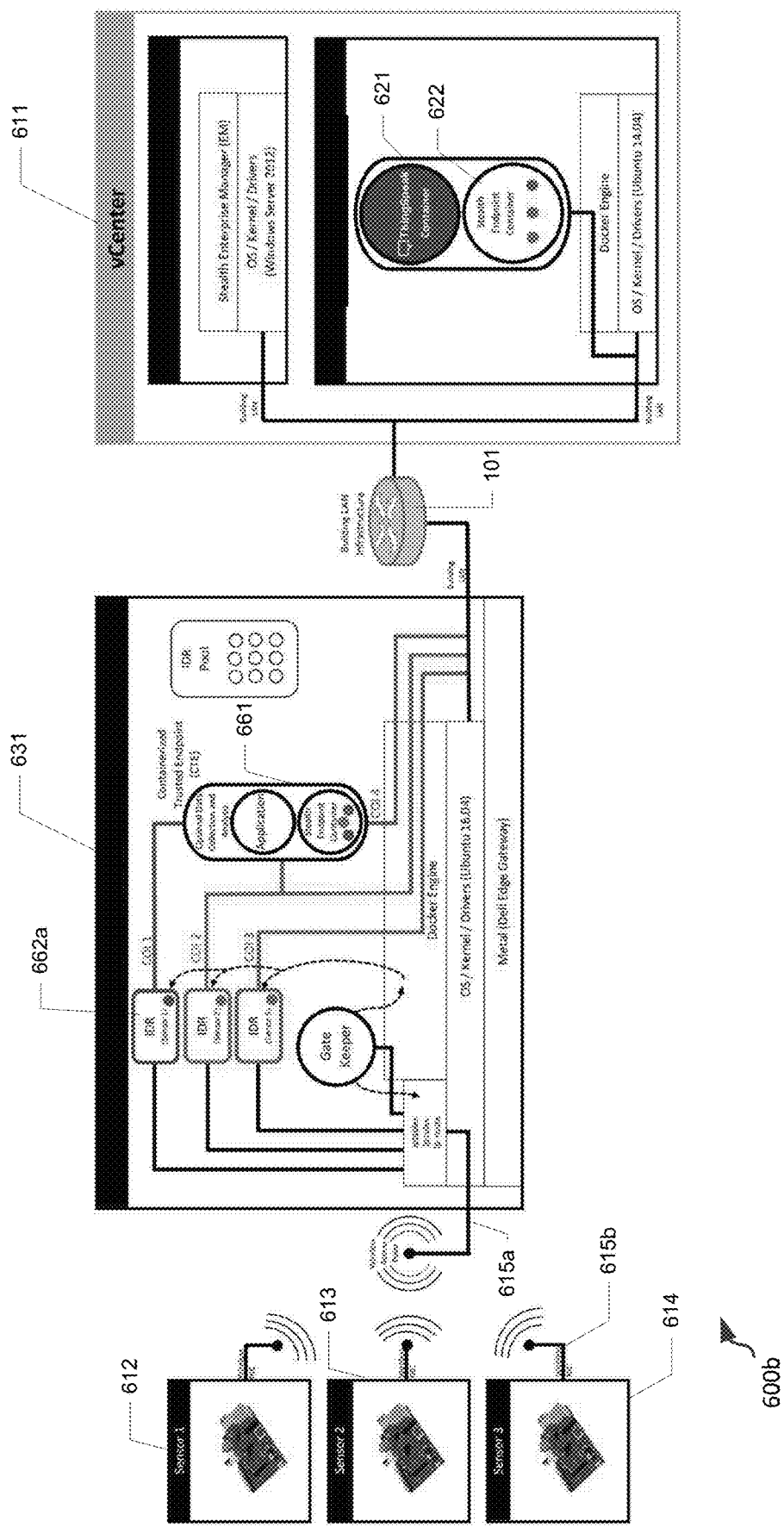

FIG. 6A-6B illustrate example secure gateway devices for use within IoT devices according to an embodiment of the present invention. FIG. 6a illustrates a IoT network 600a in which a host computer 611 obtains data from a plurality of sensor devices 612-614 via an endpoint gateway 631. Secure communications over a network 101 is provided by containerized STEALTH™ endpoint applications 643, 653 that exchange encrypted data with a STEALTH™ host application 622. As with earlier embodiments, endpoint gateway 631 possesses multiple data collection applications 642, 652 running in a containerized endpoint package 641, 651. These data collection applications 642, 652 collect, process, and organize the data from their respective devices 612-614 before passing formatted data to host computer 611 for use by additional processes.

In this particular embodiment, devices 612-614 all communicate with endpoint gateway 631 over common wireless network. Both the endpoint gateway 631 and each device 612-614 include a wireless access point 615a-615b to create the wireless network. Because all of these devices are using a common wireless network, the data collection applications 642, 644, and 652 all use a unique private encryption key such that data from device 612 may only be decrypted and understood by its data collection application 652, such that data from device 613 may only be decrypted and understood by its data collection application 644, and such that data from device 614 may only be decrypted and understood by its data collection application 642. While these private keys and subsequent segregation of device data may correspond to a community of interest, see data collection application 652, this arrangement is not a one to one correspondence as both data collection application 642 and data collection application 644 may also be part of a common community of interest created by STEALTH™ endpoint container 643.

Containers are a way to package software in a format that can run isolated on a shared operating system. Unlike VMs, containers do not bundle a full operating system—only libraries and settings required to make the software work are needed. This arrangement makes for efficient, lightweight, self-contained systems and guarantees that software will always run the same, regardless of where it's deployed. The containers allow isolating applications that service the IoT devices from each other. Stealth enabling each container also secures their network connections.

FIG. 6B illustrates another IoT network 600b in which a host computer 611 obtains data from a plurality of sensor devices 612-614 via an endpoint gateway 631. In this embodiment, the data applications of FIG. 6B are replaced with a set of IDR applications 662a-662c, each of which provides a separate community of interest for the device data obtained from devices 612-614. The endpoint gateway 631 may also include a data collection and analysis application 661 in addition to the set if IDR applications 662a-662c, if needed. As discussed in referenced to earlier embodiments, the IDR applications 662a-662c may include their own respective STEALTH™ endpoint container to securely communicate with the host computer 611. The IDR applications 662a-662c may also STEALTH™ endpoint container located in or associated with the data collection and analysis application 661. Also, while it is not shown in FIG. 6B, each of the IDR applications 662a-662c may also use separate private encryption keys to isolate the device data from the various IoT devices 612-614 if needed.

One of ordinary skill in the art will recognize that many more combinations of IoT devices, endpoint gateway functionality, and membership into various communities of interest may be used to create a secure communications system between a host computer and IoT devices while utilizing the principles and features described herein. The present invention is defined within the attached claims and should not be limited to any particular embodiment or combination of embodiments of systems discussed above.

Figure 7:
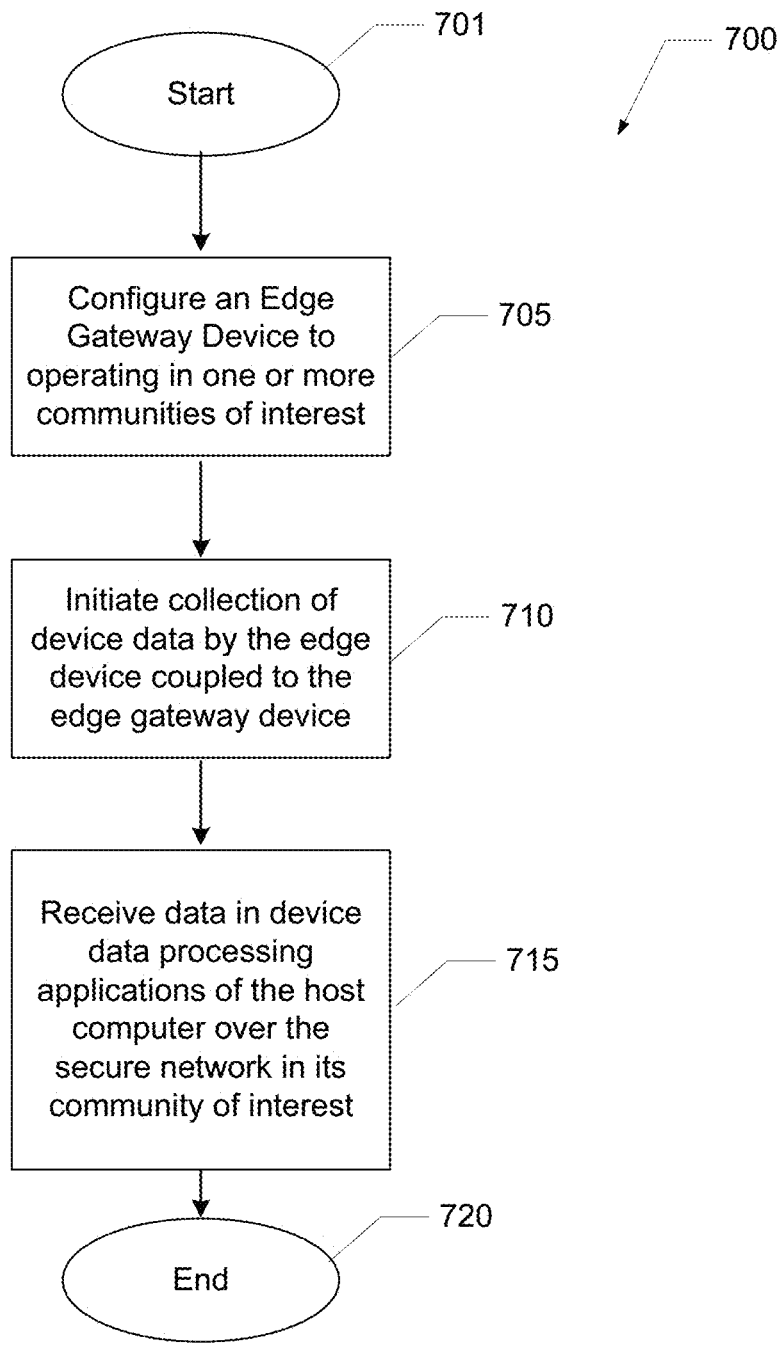
FIG. 7 illustrates a flowchart of possible operations that may be performed according to an embodiment of the present invention.

FIG. 7 illustrates a flowchart of possible operations that may be performed according to an embodiment of the present invention. The method of FIG. 7 illustrates a computer implement processing method 700 of a device data processing application running in an IoT Data server 103. The process begins 701 with block 705 in which the Stealth gateway endpoints 111-113 and configured to operate with secure communications over network 101. The configuration enables the endpoints 111-113 to operate in one or more communities of interest assigned to the edge devices 131-133 coupled to the endpoints.

Block 710 commands the edge devices 131-133 to begin collecting device data. As discussed above, the data may be processed before it is transmitted to the data server 103 by block 715 within application agents in the gateways or within a fog computing module in the edge network. The device data may also be directly transmitted to the data server 103 in its raw form. These steps are repeated for every the Stealth gateway endpoint 111-113 within the edge network. The Stealth gateway endpoints 111-113 may be constructed using any of the various gateway types discussed above in reference to FIG. 5A-C. The data will be transmitted by block 715 until commanded to end.

While the above embodiments of the present invention describe the interaction of System and Method for Providing Secure Communications and Processing for a Collection of Internet of Things (IoT) Devices, one skilled in the art will recognize that the use various security protocols and virtualized processing methodologies may be utilized within the functionality as disclosed herein. It is to be understood that other embodiments may be utilized and operational changes may be made without departing from the scope of the present invention.

One of ordinary skill in the art will appreciate that any process or method descriptions herein may represent modules, segments, logic or portions of code which include one or more executable instructions for implementing logical functions or steps in the process. It should be further appreciated that any logical functions may be executed out of order from that described, including substantially concurrently or in reverse order, depending on the functionality involved, as would be understood by those reasonably skilled in the art. Furthermore, the modules may be embodied in any non-transitory computer readable medium for use by or in connection with an instruction execution system, apparatus, or device, such as a computer-based system, processor-containing system or other system that can fetch the instructions from the instruction execution system, apparatus, or device and execute the instructions. It will be apparent to those skilled in the art that many changes and substitutions can be made to the embodiments described herein without departing from the spirit and scope of the disclosure as defined by the appended claims and their full scope of equivalents.

What is claimed is:

1. A distributed processing system for collecting and analyzing edge device data over a secure communications network, the distributed processing system comprising:
one or more host computers connected to the secure communications network, the host computers having one or more device data processing applications for receiving and analyzing device data, each of the device data processing applications being associated with one or more of a plurality of communities of interest implemented within the secure communications network;
a plurality of edge devices including one or more sensor devices communicating with one or more of the device data processing applications, each of the plurality of edge devices belonging to one or more of the plurality of communities of interest;
wherein each one of the one or more communities of interest isolates its data using a separate encryption key, and
each of the plurality of edge devices and host computers hosting device data processing applications within a particular community of interest of the plurality of communities of interest is configured to:
respond to one or more received communications packets when the data included in the one or more received communications packets received at the device is part of the particular community of interest, and
decline to respond to communication packets from entities outside the particular community of interest.

2. The distributed processing system according to claim 1, wherein the plurality of edge devices comprise:
a first sensor device having its own secure communications endpoint.

3. The distributed processing system according to claim 1, wherein the plurality of edge devices comprise:
a second sensor coupled to a gateway providing a microbridge secure communications endpoint for communicating over the secure communications network within its respective community of interest; and
the gateway having one or more application agents running to communicate with its corresponding more device data processing applications.

4. The distributed processing system according to claim 1, wherein the plurality of edge devices comprise:
a third sensor coupled to a communications gateway providing a shared secure communications endpoint for communicating over the secure communications network within its respective community of interest; and
the gateway having one or more application agents running to communicate with its corresponding more device data processing applications.

5. The distributed processing system according to claim 4, wherein the gateway provides a shared secure communications endpoint with micro-segmentation of edge devices and application agents into separate communities of interest for communicating over the secure communications network.

6. The distributed processing system according to claim 1, wherein edge devices comprise a data generating sensor.

7. The distributed processing system according to claim 6, wherein edge devices further comprise a programmable control device.

8. The distributed processing system according to claim 1, wherein plurality of edge devices further comprises a fog computing module supporting one or more application agents running to process the device data from edge devices into a reduced set of data before transmitting the reduced set of data with the one or more device data processing applications.

9. A computer implemented method for collecting and analyzing edge device data over a secure communications network, the method comprising:
    configuring an edge device gateway to communicate with a server implementing an device data processing application over a secure communications network, the secure communications network including a plurality of communities of interest implemented using an encryption key associated with each of the respective plurality of communities of interest, the edge device gateway and the server hosting the device data processing application being within a common community of interest;
    initiating collection of edge device data within one or more edge devices coupled to the edge device gateway, the one or more edge devices including a data generating sensor, each of the one or more edge devices having a secure connection to the edge device gateway; and
    receiving the edge device data at the server from the edge device gateway over a secure communications network, the edge device data being secured using the encryption key associated with the common community of interest;
    wherein each of the devices within the secure communications network, including the edge device gateway and the server hosting the device data processing application, is configured to:
    respond to one or more received communications packets only when the data included in the one or more received communications packets received at the device is part of the particular community of interest, and
    decline to respond to communication packets from entities outside the particular community of interest.

10. The computer implemented method according to claim 9, wherein the plurality of edge devices comprise:
    a first sensor device having its own secure communications endpoint.

11. The computer implemented method according to claim 9, wherein the plurality of edge devices comprise:
    a second sensor coupled to a gateway providing a micro-bridge secure communications endpoint for communicating over the secure communications network within its respective community of interest; and
    the gateway having one or more application agents running to communicate with its corresponding more device data processing applications.

12. The computer implemented method according to claim 9, wherein the plurality of edge devices comprise:
    a third sensor coupled to a communications gateway providing a shared secure communications endpoint for communicating over the secure communications network within its respective community of interest; and
    the gateway having one or more application agents running to communicate with its corresponding more device data processing applications.

13. The computer implemented method according to claim 12, wherein the gateway provides a shared secure communications endpoint with micro-segmentation of edge devices and application agents into separate communities of interest for communicating over the secure communications network.

14. The computer implemented method according to claim 9, wherein plurality of edge devices further comprises a fog computing module supporting one or more application agents running to process the device data from edge devices into a reduced set of data before transmitting the reduced set of data with the one or more device data processing applications.

15. A computer data product containing a non-transitory computer readable storage medium comprising a set of instructions, which when executed by a computing device, cause the computing device to implement a method for collecting and analyzing edge device data over a secure communications network, the method comprising:
    configuring an edge device gateway to communicate with a server implementing an device data processing application over a secure communications network, the secure communications network including a plurality of communities of interest implemented using an encryption key associated with each of the respective plurality of communities of interest, the edge device gateway and the server hosting the device data processing application being within a common community of interest;
    initiating collection of edge device data within one or more edge devices coupled to the edge device gateway, the one or more edge devices including a data generating sensor, each of the one or more edge devices having a secure connection to the edge device gateway; and
    receiving the edge device data at the server from the edge device gateway over a secure communications network, the edge device data being secured using the encryption key associated with the common community of interest;
    wherein each of the devices within the secure communications network, including the edge device gateway and the server hosting the device data processing application, is configured to:
    respond to one or more received communications packets when the data included in the one or more received communications packets received at the device is part of the particular community of interest, and
    decline to respond to communication packets from entities outside the particular community of interest.

16. The computer data product according to claim 15, wherein the plurality of edge devices comprise:
    a first sensor device having its own secure communications endpoint.

17. The computer data product according to claim 15, wherein the plurality of edge devices comprise:
    a second sensor coupled to a gateway providing a micro-bridge secure communications endpoint for communicating over the secure communications network within its respective community of interest; and
    the gateway having one or more application agents running to communicate with its corresponding more device data processing applications.

18. The computer data product according to claim 15, wherein the plurality of edge devices comprise:
- a third sensor coupled to a communications gateway providing a shared secure communications endpoint for communicating over the secure communications network within its respective community of interest; and
- the gateway having one or more application agents running to communicate with its corresponding more device data processing applications.

19. The computer data product according to claim 18, wherein the gateway provides a shared secure communications endpoint with micro-segmentation of edge devices and application agents into separate communities of interest for communicating over the secure communications network.

20. The computer data product according to claim 19, wherein plurality of edge devices further comprises a fog computing module supporting one or more application agents running to process the device data from edge devices into a reduced set of data before transmitting the reduced set of data with the one or more device data processing applications.

* * * * *